United States Patent
Hediger et al.

(10) Patent No.: US 6,882,826 B2
(45) Date of Patent: Apr. 19, 2005

(54) PROCESS FOR THE TRANSFER OF DATA

(75) Inventors: Ralf Hediger, Munich (DE); Volkhard Mueller, Wolfersdorf (DE)

(73) Assignee: ATMEL Germany GmbH, Heilbronn (DE)

( * ) Notice: Subject to any disclaimer, the term of this patent is extended or adjusted under 35 U.S.C. 154(b) by 449 days.

(21) Appl. No.: 10/202,077

(22) Filed: Jul. 23, 2002

(65) Prior Publication Data

US 2003/0027542 A1 Feb. 6, 2003

(30) Foreign Application Priority Data

Aug. 3, 2001 (DE) ............................. 101 38 218

(51) Int. Cl.⁷ ............................................. H04B 5/00
(52) U.S. Cl. ..................................... 455/41.1; 455/69
(58) Field of Search ............................ 455/41.1, 41.2, 455/39, 44, 69; 340/10.1, 10.3, 10.4; 342/51

(56) References Cited

U.S. PATENT DOCUMENTS

| | | |
|---|---|---|
| 4,975,654 A | 12/1990 | Becker et al. |
| 5,345,231 A | 9/1994 | Koo et al. |
| 5,831,348 A | 11/1998 | Nishizawa |
| 6,044,333 A | 3/2000 | Stobbe et al. |
| 6,133,858 A | 10/2000 | Karl et al. |
| 6,141,541 A * | 10/2000 | Midya et al. ............... 455/91 |

FOREIGN PATENT DOCUMENTS

| | | |
|---|---|---|
| AU | 395224 | 10/1992 |
| DE | 19651719 | 12/1997 |
| DE | 19643410 | 6/1998 |
| DE | 19744781 | 4/1999 |
| DE | 19927320 | 12/2000 |
| EP | 0473569 | 3/1992 |
| JP | 09083583 A * | 3/1997 |
| JP | 2001211214 | 8/2001 |

* cited by examiner

Primary Examiner—Nguyen T. Vo
(74) Attorney, Agent, or Firm—W. F. Fasse; W. G. Fasse

(57) ABSTRACT

In a process for the transfer of data between a base station and a transponder by an electromagnetic carrier wave, on which data bits are modulated by amplitude modulation, the duration of a modulation interval of a data bit is determined and compared with a reference value, a correction value is calculated from the deviation of the actual value of the duration of the modulation interval from the reference value, and the actual values of the duration of the modulation intervals of the following data bits are corrected with the correction time. As a result of the correction, the duration of the modulation intervals may be reduced and the data transfer rate increased or the transfer rate may be adapted to the transfer conditions.

8 Claims, 1 Drawing Sheet

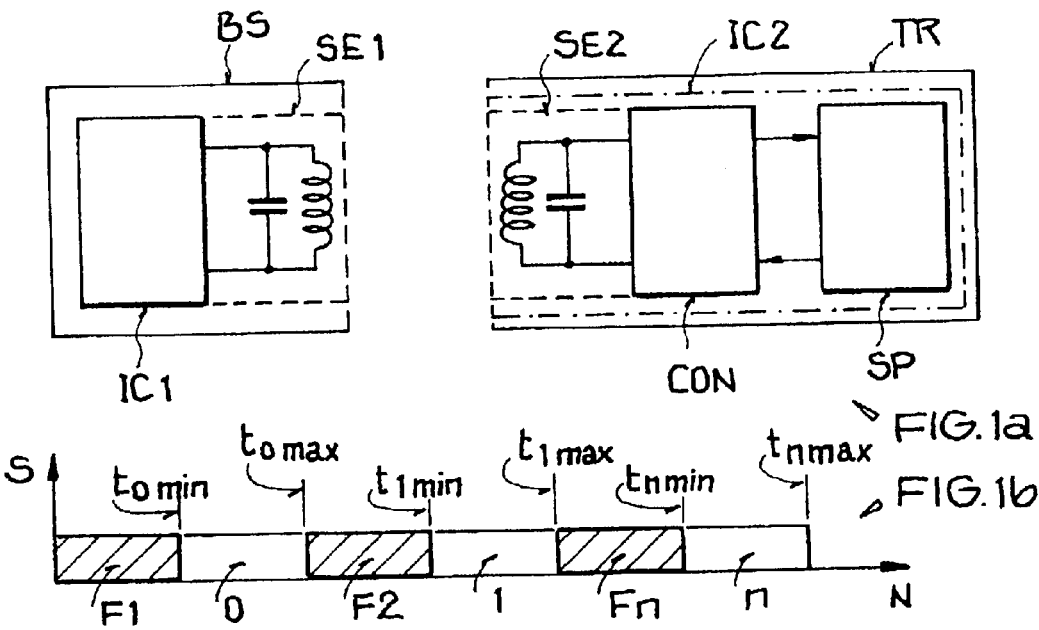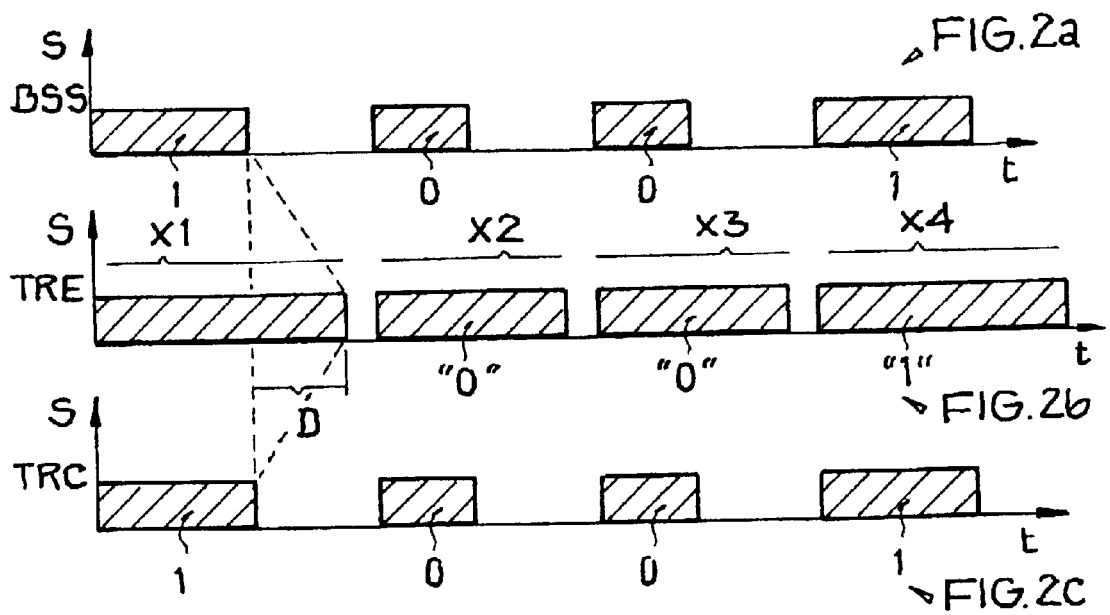

PROCESS FOR THE TRANSFER OF DATA

BACKGROUND OF THE INVENTION

The present invention relates to a process for the transfer of data between a base station and a transponder by means of an electromagnetic carrier wave, on which data bits are modulated by means of amplitude modulation.

Such a process is known from the publication EP 473 569 B1. In this case, digital data are exchanged between a base station and a passive transponder by means of an amplitude-modulated carrier wave. The individual bits of a data item comprise a time span in which the electromagnetic field is activated and a time span in which the electromagnetic field (field gap) is deactivated, the field gap serving as a separator between two successive bits. The significance of the bits is determined from the length of time in which the electromagnetic field is activated. Moreover, with the passive system the energy for the transponder is generated from the carrier field by means of absorption modulation.

Processes for the transfer of data in the field of transponders are generally used to perform an identification operation and to read special data for this or store the data in the transponder, as well as to carry out an authentication process or anti-collision process. Thus, in applications in the automotive field, the authentication process between the base station and transponder must be concluded within a duration of about 100 ms so that the user does not notice any delay. For this, a plurality of data items must be transferred in short time spans by means of a carrier wave, in which case amplitude modulation or pulse-width modulation (PWM) in particular is used as modulation process in the field of passive transponders.

Forming the basis of the data transfer between transponder and base station is a data protocol, which amongst other things defines the number of significances or logic values per data bit, wherein, in contrast to a significance of the data bits coded by the modulation index of the amplitude, in the case of a PWM-coded carrier wave the significances of the data bits are exclusively defined by means of the duration of the modulation intervals. In the case of a PWM-coded carrier wave, the different communication conditions, e.g. the oscillation start-up and decay behavior of the respective receiver coils, are taken into consideration via the duration of the modulation intervals. Moreover, the individual modulation intervals are separated by blank or intermediate regions in order to perform a clear allocation of the significance of the data bits. If the duration of the detected modulation interval lies in a blank region in the receiver, a read error is passed back to the transmitter and the corresponding data item is repeated by the transmitter. A further type of read error occurs in particular in unfavorable receiving conditions when too short or too long a duration of the modulation interval is measured and thus a false significance of the data bits is determined. This read error may be detected by a check total.

The disadvantage of previous processes is that the transfer rate is reduced by read errors. In the case of time-critical applications, this is evident as an inconvenience particularly with the further increasing security requirements in the case of an authentication operation.

SUMMARY OF THE INVENTION

The present invention seeks to provide a process for the transfer of data which increases the reliability of data transfer with a wireless communication.

According to the present invention, there is provided a process for the transfer of data between a base station and a transponder by means of an electromagnetic carrier wave, data bits being modulated on said carrier wave by means of amplitude modulation, wherein:
   an actual value of a duration of a modulation interval of a said data bit is determined and compared with a reference value,
   a correction value is calculated from the deviation of the actual value of the duration of said modulation interval from said reference value, and
   the actual values of the duration of the modulation intervals of the following data bits are corrected with said correction value.

Hence, the invention seeks to change the length of the received signal by means of a calculated correction value with a contact-less communication between a base station and a transponder. For this, with an electromagnetic carrier wave, onto which data bits are modulated by means of amplitude modulation, the duration of at least one modulation interval of a data bit is determined and compared with a reference or nominal value, and a correction value is calculated from the deviation of the actual value of the duration of the modulation interval from the reference value, and the actual values of the duration of the modulation intervals of the following data bits are corrected with the correction value.

An advantage of the process according to the invention is that the reliability of the data transfer between the base station and the transponder is increased because of the correction, since the dependence of the duration of the modulation intervals on the transfer conditions is reduced. In particular, it is possible to greatly reduce the number of read errors, in the case of which the measured duration of the modulation intervals lies within a blank region, since the increase of the interval duration caused by the change in amplitude in the receiver coil is compensated. Moreover, the data transfer rate or throughput may be improved by the reduction of the duration of the modulation intervals for the data bits defined in the data protocol and the reduction of the intervals between the individual data bits. Moreover, the likelihood of the significance of one or more data bits being incorrectly determined as a result of too short or too long a duration of the measured modulation interval, e.g. in unfavorable receiving conditions, is reduced in the case of a PWM-coded carrier wave.

The data transfer rate may be especially increased for a PWM-coded carrier wave, since besides the size of the blank regions the duration of the modulation intervals agreed in the protocol for the individual significances of the data bits is also reduced, and therefore the increase in data transfer rate in proportion to the number of significances of a data bit, i.e. in the case of an n-fold significance, is particularly great. Moreover, the magnitude of the correction value in proportion to the magnitude of the modulation index of the carrier wave, i.e. for a PWM-coded carrier wave, is particularly high. Furthermore, the magnitude of the correction value is dependent on the receiving conditions, i.e. the oscillation start-up and decay behavior of the receiver coil, and also on the magnitude of the threshold value, above which a carrier wave is detected.

Studies by the Applicant have shown that it is particularly advantageous if the calculation of the correction value is performed at the beginning of the data transfer, for example by means of a check bit of a preset significance. It is sufficient to determine the correction value once so long as there is only a small change in the communication conditions during the entire data transfer. If the communication conditions between the transponder and the base station change, then it is advantageous to perform the calculation of the correction value repeatedly during the data transfer or also repeatedly within a data sequence in the case of particularly quick changes. This enables a reliable data transfer to also be assured in the case of quick changes in the communication conditions.

In another development of the process it is advantageous if in the case of passive transponders, the calculation of the correction value is performed exclusively in the transponder, since for returning the response signal a passive transponder performs a load modulation of the carrier field activated by the base station, and the amplitude change in the coil of the base station achievable with this is very small, whereas conversely the amplitude in the coil of the transponder changes markedly in dependence on the modulation index of the base station and is particularly large in the case of a PWM-coded carrier wave, since the modulation index generally alternates between 0% and 100%.

In a development of the process, it is particularly advantageous if for determination of the duration of the modulation interval, the field cycles of the carrier wave within the modulation interval are counted with a counter, for example. From the difference in the measured number of field cycles and a reference value, which is stored in a data memory, for example, the correction value for the following modulation intervals may be determined at a low expense in hardware and/or software. This is very advantageous particularly for passive transponders because they do not have their own energy supply.

In another development of the process, a transfer rate adapted to the respective transfer conditions may be achieved from the magnitude of the correction value. For this, the magnitude of the correction value is communicated to the transmitter (transponder or base station) by means of an acknowledge signal. The transfer protocol is then changed by the transmitter by changing the duration of the modulation intervals and/or the duration of the blank regions.

In another development of the process an acknowledge signal is transmitted by a passive transponder if the level of the supply voltage in the transponder falls below or exceeds a preset value. The base station then changes the protocol for data transfer by changing the duration of the modulation intervals and/or the duration of the blank regions. This allows the energy supply or the range of the communication to be adjusted in conjunction with the data transfer rates.

BRIEF DESCRIPTION OF THE DRAWINGS

A preferred embodiment of the present invention will now be described, by way of example only, with reference to the accompanying drawings, of which:

FIG. 1a shows an arrangement with a base station and a passive transponder;

FIG. 1b shows a part of a transfer protocol for a PWM-coded carrier wave with an n-fold significance of a data bit;

FIG. 2a shows a PWM-coded signal transmitted from the base station;

FIG. 2b shows the duration of the modulation intervals of the signal from FIG. 2a measured in the transponder; and FIG. 2c shows the duration of the modulation intervals of the signal from FIG. 2b corrected in the transponder.

DESCRIPTION OF THE PREFERRED EMBODIMENTS

Referring to the drawings, FIG. 1a shows an arrangement for data transfer comprising a base station BS and a passive transponder TR. In this case, the transponder TR takes its energy from the carrier wave of the base station BS by means of absorption modulation. Such systems are used in the automotive field, wherein the transponder is installed in the door key and the base station BS is installed in the automobile. The base station BS has an integrated circuit IC1, which controls a transmitter and receiver unit SE1. For the transfer of data, the base station transmits an amplitude-modulated carrier wave, which is received by the transponder TR by means of a transmitter and receiver unit SE2 and is forwarded to a control unit CON for evaluation, wherein the transmitter and receiver unit SE2 moreover absorbs the energy necessary to supply the transponder TR. In addition, the integrated circuit IC2 comprises a control unit CON and a memory unit SP, in which the characteristic values of the protocol used for data transfer are stored, amongst other things. If the transponder TR recognizes a data transfer, the duration of the modulation interval of a preset significance in the case of a data bit transmitted by the base station is determined at the start of the data transfer within the control unit CON and a calculation of the correction value is performed by means of the reference value stored in the memory unit SP, wherein the magnitude of the correction value is proportion to the magnitude of the modulation index of the carrier wave and is, moreover, dependent on the oscillation start-up and decay behavior of the transmitter and receiver unit SE2.

In the subsequent explanations the process according to the preferred embodiment is explained on the basis of a PWM-coded carrier wave, wherein the modulation index of the carrier wave alternates between 0% and 100%, i.e. the data information or the significance of the data bits is coded via the duration of the individual modulation intervals. Moreover, the duration of the respective modulation interval is determined from the measured number of field cycles, in which the carrier signal in the transponder generates a voltage value above a threshold value.

FIG. 1b shows the section of a protocol for the data transfer for a PWM-coded carrier wave. The number of field cycles for an n-fold significance of a data bit is recorded herein. If the number of field cycles measured during a modulation interval lies within the shaded blank region F1, F2 or $F_n$, a read error is recognized by the control unit CON, if the measured number of field cycles lies in one of the non-shaded areas 0, 1, n, the transmitted data bit is allocated a significance by the control unit CON. Moreover, the lowest significance "0" of the data bit is assigned to the lowest value range $t_{omin}$ to $T_{omax}$, the range $t_{1min}$ to $t_{1max}$ is assigned to the second significance "1", and finally the n-fold significance of the data bit is assigned to the value range $t_{nmin}$ to $t_{nmax}$.

An advantage of the process according to the invention is that the duration of the blank regions F0 to $F_n$ as well as the significance ranges 0 to n may be substantially reduced by means of the increased reliability in order to thus increase the data transfer rate in proportion to the n-fold significance of the data bit. A short communication time is achieved, even with large quantities of data, as a result of the simultaneous reduction in read errors, in particular when a plurality of transponders are located in the field of one base station.

FIGS. 2a–c show the correction of the measured duration of the modulation intervals for a PWM-coded carrier wave with a two-fold significance. The signal magnitude S over time t of the carrier wave is respectively shown here. The evaluation of the signal is performed by means of a protocol, as explained in association with FIG. 1b.

FIG. 2a shows a signal BSS transmitted from the base station BS which shows a data sequence composed of a succession of significances of individual data bits and is part of a data word or item. Within the data sequence the individual bits are separated by so-called field gaps, the signal BSS being deactivated during these times.

FIG. 2b shows the signal TRE detected by the transmitter and receiver unit SE2 in the transponder TR. The duration of the modulation intervals X1, X2, X3 and X4 for the significances of the individual data bits are increased here by a constant value D, which is determined essentially by the oscillation start-up and decay behaviour of the coil in the transmitter and receiver unit SE2. Moreover, the field gap is reduced by the constant value D and the relative difference in the duration of the modulation intervals for the two significances "0" and "1" is reduced. If an allocation of the measured duration to the value defined in the protocol is performed by the control unit CON, read errors are exclusively recognised by the control unit, since the measured durations X1 to X4 lie within the blank regions F0 and F1 of the protocol.

FIG. 2c shows a signal TRC, which is generated by the control unit CON by correction of the signal TRE. For this, in the case of the signal TRE the duration of the modulation interval X1, the significance of which is preset, is stored with the reference value in the memory unit SP, compared and calculates the correction value D, with which the following duration of the modulation intervals X2, X3 and X4 are decreased. The evaluation of the data signal is then performed by the control unit CON. As a result of the correction, the duration of the modulation intervals in the signal TRC is the same as the duration of the modulation intervals of the signal BSS transmitted from the base station.

An advantage of the process according to the invention is that the oscillation start-up and decay behaviour of the transmitter and receiver units, which differs from transponder to transponder, may be rectified by means of the correction. In addition, the variation in the duration of the modulation intervals, which results from the magnitude of the threshold values in association with a change in the communication conditions and a change in the value of the supply voltage, may be suppressed. Moreover, the range may be increased, since with increased communication distance between the transponder and base station, the detected amplitude of the carrier wave quickly decreases in keeping with the near field approach, and the base station increases the duration of the modulation intervals by means of an acknowledge signal transmitted by the transponder to the base station. On average over the time of a data transfer the energy gain of the transponder is thus increased, i.e. the communication range is thus increased. A further advantage is that with a sufficient energy supply from the field of the base station the transponder causes the base station to decrease the modulation intervals in order to reduce the communication time. In addition, the data transfer rate may be reduced again where the communication conditions or the receiving conditions require this in the course of a data transfer, and an adaptive regulation of the baud rate may thus be achieved.

It will be understood that the above description of the present invention is susceptible to various modification, changes and adaptations.

What is claimed is:

1. A process for the transfer of data between a base station and a transponder by means of an electromagnetic carrier wave, data bits being modulated on said carrier wave by means of amplitude modulation, wherein:

an actual value of a duration of a modulation interval of a said data bit is determined and compared with a reference value, a correction value is calculated from the deviation of the actual value of the duration of said modulation interval from said reference value, and the actual values of the duration of the modulation intervals of the following data bits are corrected with said correction value.

2. A process according to claim 1, wherein the calculation of said correction value is performed at the beginning of a sequence of data consisting of data bits.

3. A process according to claim 1, wherein the calculation of said correction value is performed by means of a preset significance of a check bit.

4. A process according to claim 1, wherein the calculation of said correction value is performed repeatedly within a data sequence.

5. A process according to claim 1, wherein said transponder is a passive transponder, and the calculation of said correction value is performed in said transponder.

6. A process according to claim 1, wherein for determination of the duration of said modulation interval, the field cycles of said carrier wave within said modulation interval are counted.

7. A process according to claim 1, wherein said transponder transmits an acknowledge signal and said base station changes the duration of said modulation intervals of said following data bits.

8. A process according to claim 7, wherein said transponder is a passive transponder having a supply voltage and an acknowledge signal is transmitted by said transponder if the level of the supply voltage falls below or exceeds a preset value.

* * * * *

UNITED STATES PATENT AND TRADEMARK OFFICE
CERTIFICATE OF CORRECTION

PATENT NO. : 6,882,826 B2
DATED : April 19, 2005
INVENTOR(S) : Hediger et al.

It is certified that error appears in the above-identified patent and that said Letters Patent is hereby corrected as shown below:

Title page,
Item [57], ABSTRACT,
Line 10, after "correction" (1st occurrence), replace "time" by -- value --;

Column 1,
Line 33, after "as", insert -- a --;

Column 4,
Line 23, after "is", insert -- in --;
Line 41, after "region", insert -- F0, --;

Column 6,
Line 19, after "from", replace "the" by -- a --.

Signed and Sealed this

Twentieth Day of September, 2005

JON W. DUDAS
*Director of the United States Patent and Trademark Office*